April 26, 1927.  S. H. LIBBY  1,626,470
THRUST BEARING
Filed Sept. 22, 1923
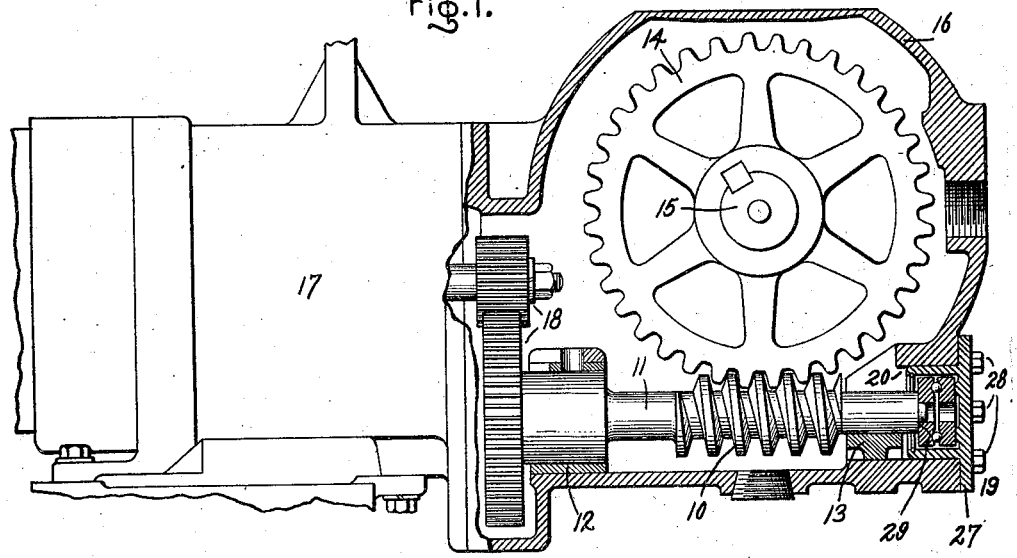
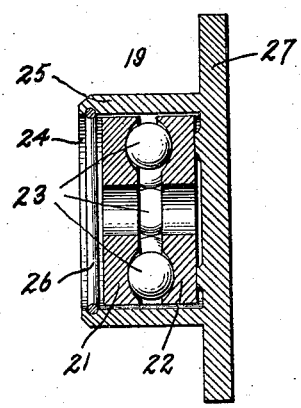
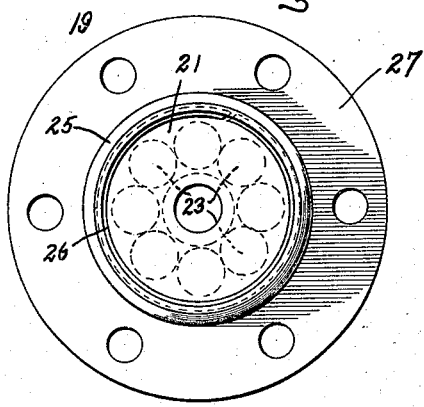
Inventor:
Sam H. Libby,
by Alexander S. [illegible]
His Attorney.

Patented Apr. 26, 1927.

1,626,470

UNITED STATES PATENT OFFICE.

SAM H. LIBBY, OF EAST ORANGE, NEW JERSEY, ASSIGNOR TO GENERAL ELECTRIC COMPANY, A CORPORATION OF NEW YORK.

THRUST BEARING.

Application filed September 22, 1923. Serial No. 664,327.

This invention relates to thrust bearings, and in particular to anti-friction thrust bearings located in the housing or frame of a machine to receive the end thrust of a revolving shaft.

One of the objects of my invention is to provide an anti-friction thrust bearing unit of simple and sturdy construction which may be inexpensively manufactured and easily installed.

A further object of my invention is to provide such a thrust bearing unit in the form of a removable plug which may be readily inserted in or removed from an aperture in the housing or frame of the machine without disconnecting or dismantling the other operating parts of the machine.

My invention is particularly adapted to be applied to thrust bearings employed in enclosed worm gear driving mechanisms for portable machines such as trolley hoists or the like although its application is not limited thereto, since the advantageous features of construction and operation of my improved plug thrust bearing unit may be realized in other applications.

The various features of novelty which characterize my invention are pointed out with particularity in the claims annexed to and forming part of this specification. For a proper understanding of my invention reference may be had to the following description taken in connection with the accompanying drawing in which Fig. 1 shows a view partly in section of a worm gear driving mechanism which is provided with my improved plug thrust bearing unit. Fig. 2 is a sectional view and Fig. 3 is a plan view of the assembled thrust bearing unit.

Referring to Fig. 1, a suitable enclosed worm gear driving mechanism to which my invention is applied consists of the driving worm 10 on shaft 11 supported by bearings 12 and 13, in driving relation with worm wheel 14 which is keyed to the driven shaft 15. A housing or casing 16 is suitably shaped to enclose the worm gearing and allow the worm to run in a bath of oil, and has integral cast-in pillow blocks properly machined to receive the bearings 12 and 13, as well as the bearing for shaft 15, which is not shown in the drawing. Housing 16 is fitted oil tight and secured to a motor 17 which drives the worm 10 through suitable speed reduction gearing 18 to rotate the wheel 14.

The resultant end thrust of worm shaft 11 is to the right and is sustained and transmitted to the housing 16 by means of my improved plug thrust bearing 19 which is fitted into an aperture 20 in the housing 16 in axial alignment and in contact with the end of the worm shaft 11.

As shown in Fig. 2 the plug thrust bearing unit comprises a pair of race rings 21 and 22, each having a substantially rectangular cross section with a circular race in one radial surface, and assembled in co-axial opposing relation in a cylindrical chamber 24 in the body portion 25 of plug 19, with the rolling elements 23 between the races. The race rings 21 and 22 and the rolling elements 23 constitute an anti-friction ball bearing, but it will be evident to those skilled in the art that these parts may be slightly changed to form other types of anti-friction bearings, for example a roller bearing, if desired.

A resilient split locking ring 26 is sprung into a small circular groove at the mouth of chamber 24 to loosely retain the race rings and rolling elements in operative relation in the cavity. In the bottom of chamber 24 a circular boss is provided against which the race ring 22 abuts and which has a mean diameter substantially the same as that of the races in order to equalize the strain set up by the thrust pressure. The plug 19 is provided with a flange base 27 having equi-spaced holes, as shown in Fig. 3 for the bolts 28 which secure the plug tightly in the aperture 20 and transmit the thrust pressure from the plug to the housing.

Upon assembling my improved plug thrust bearing, as shown in Fig. 2, it will be observed that the race rings, rolling elements and retaining ring are received and supported in operative relation in the chamber 24 of plug 19, and thus form a unit which may readily be inserted into the aperture 20 in the housing of the driving mechanism and secured in operating relation to sustain the end thrust of the worm shaft 11 entirely from the outside of the housing and without disconnecting or dismantling the other parts of the machine. To facilitate the insertion of the plug 19 into the aperture 20, the end may be chamfered as shown in Fig. 2 and also the thrust end of the worm shaft 11 may be provided with a chamfered centering collar 29 to guide the race 21 into axial alignment with the shaft, although this ordinarily is not necessary. The removal of the thrust bearing unit for the purpose of cleaning or repair is easily accomplished by merely unscrewing the bolts 28 and sliding the plug thrust bearing unit out of the aperture 20.

In accordance with the provisions of the patent statutes, I have described a preferred structure embodying my invention and the manner of using the same, but I desire to have it understood that the structure shown is only illustrative, and that the invention may be carried out by other means.

What I claim as new and desire to secure by Letters Patent of the United States, is:—

A plug thrust bearing unit comprising a pair of coaxial rings of substantially rectangular cross section, each having a circular race in a radial surface and in opposing relation, a plurality of balls between said race rings, a plug having a cylindrical chamber to receive said rings and balls, removable means for retaining said rings and balls in said chamber, said plug having a thrust receiving boss in the bottom of said chamber of circular form and of a mean diameter substantially the same as that of the said races, and said plug being provided with means for securing the plug in an aperture to sustain the end thrust of a revolving shaft through the said boss, race rings and balls.

In witness whereof, I have hereunto set my hand this twentieth day of September, 1923.

SAM H. LIBBY.